United States Patent [19]

Arjmand et al.

[11] Patent Number: 4,667,340
[45] Date of Patent: May 19, 1987

[54] VOICE MESSAGING SYSTEM WITH PITCH-CONGRUENT BASEBAND CODING

[75] Inventors: Masud Arjmand; George R. Doddington, both of Richardson, Tex.

[73] Assignee: Texas Instruments Incorporated, Dallas, Tex.

[21] Appl. No.: 484,720

[22] Filed: Apr. 13, 1983

[51] Int. Cl.$^4$ .............................................. G10L 1/00
[52] U.S. Cl. ................................... 381/31; 364/513.5
[58] Field of Search ............... 364/513.5, 513; 381/36, 381/37, 38, 39, 40, 41, 51, 29, 30, 31, 32, 33, 34, 35

[56] References Cited

U.S. PATENT DOCUMENTS

| | | | |
|---|---|---|---|
| 3,624,302 | 11/1971 | Atal | 364/513.5 |
| 4,220,819 | 9/1980 | Atal | 381/38 |
| 4,330,689 | 5/1982 | Kang et al. | 381/36 |
| 4,472,832 | 9/1984 | Atal et al. | 381/40 |

Primary Examiner—Gareth D. Shaw
Assistant Examiner—Martin Yuen
Attorney, Agent, or Firm—William E. Hiller; James T. Comfort; Melvin Sharp

[57] ABSTRACT

An improved voice messaging system using LPC baseband speech coding. In standard LPC-based baseband speech coding techniques, LPC parameters plus a residual signal are transmitted. To save band width, the residual signal is filtered so that only a fraction of its full bandwidth (e.g., the bottom 1 KHz) is transmitted. At the decoding station, this fraction of the residual signal (which is known as the baseband signal) is copied up or otherwise expanded to higher frequencies, to provide the excitation signal which is filtered according to the LPC parameters to provide the reconstituted speech output. However, this tends to produce perceptually significant ringing effects and high frequency distortion in the reconstituted signal. The present invention uses a variable baseband width, which is adaptively varied, in accordance with an integral multiple of the frequency of the pitch of the input signal, to provide a more appropriate harmonic match in the reconstituted excitation signal. This eliminates the noticeable ringing effect.

18 Claims, 8 Drawing Figures

Microfiche Appendix Included
(1 Microfiche, 29 Pages)

VOICE MESSAGING SYSTEM WITH PITCH-CONGRUENT BASEBAND CODING

A microfiche appendix containing computer program listings and consisting of a single microfiche having 29 frames is submitted as part of the disclosure.

BACKGROUND AND SUMMARY OF THE INVENTION

The present invention relates to systems for encoding and decoding human speech. In particular, the present invention relates to voice messaging systems. Even more specifically, the present invention relates to integrated voice/data communication/storage systems, wherein reasonably high bandwidth (e.g. 4800 or 9600 baud) digital channels are available.

In voice messaging systems, a transmitter and a receiver are separated in space, time, or both. That is, a speech message is coded at a transmitter station, and the bits corresponding to the encoded speech can then be stored in the transmitter or in a peripheral of the transmitter, to be recalled and regenerated into synthetic speech later, or can be transmitted to a remote receiver location, to be regenerated into human speech immediately or at a later time. That is, the present invention applies to systems wherein a transmitter and a receiver station are connected by a data channel regardless of whether the transmitter or receiver are separated in space or in time or both.

A typical linear predictive coding (LPC) baseband speech coding system is outlined in FIG. 1. The present invention teaches a significant modification and improvement of such a system. After LPC spectral parameters (such as the reflection coefficients $k_i$ or the inverse filter coefficients $a_k$) have been extracted from a speech input, the speech input is filtered by the LPC analysis filter to generate the residual error signal. That is, the LPC model, as usually simplified, models each input sample as a linear combination of previous input samples with some excitation function:

$$S_n = \sum_{i=1}^{N} a_i S_{n-i} + u_n \qquad (1)$$

where $u_n$ is the excitation function. While the average value of the series $u_n$ will be approximately 0, the time series $u_n$ contains important information. That is, the linear predictive coding model is not a perfect model, and significant useful information is not completely modeled by the LPC parameters, and therefore remains in the residual signal $u_n$. The model order N places some limitation on the fit of the LPC model, but, in any useful speech application some information remains in the residual signal $u_n$ rather than in the LPC parameters.

The LPC model can intuitively be thought of as modeling the actual function of the human voice. That is, the human voice can be considered as an excitation function (either an impulse train generated by the larynx, or white noise generated during unvoiced speech) applied to a passive acoustic filter, corresponding to the acoustic characteristics of the vocal tract. In general, the characteristics of the passive acoustic filter (i.e. the resonance and dampening characteristics of mouth, chest, etc.) will be modeled by the LPC parameters, while the characteristics of the excitation function will generally appear in residual time series $u_n$.

The phonemic characteristics of speech will typically change at very slow rate, and the acoustic frequency-domain characteristics will change nearly as slowly. Thus, a frame rate is normally chosen to track the acoustic changes in speech over relatively long periods. For example, the frame rate is typically chosen to be somewhere in the neighborhood of 100 Hz, and the acoustic frequency-domain characteristics of the speech signal can be treated as essentially constant over the width of any one frame. By contrast, the speech must be sampled at a Nyquist rate corresponding to the acoustic bandwidth which must be measured. Thus, a typical sampling rate would be 8 kilohertz, so that eighty samples would be found in each frame. The crucial advantage of LPC models is that while the input time series changes once every sample, the LPC parameters change once every frame. The residual series $u_n$ also changes once per sample, but it contains less information than the input time series $s_n$, and can usually be efficiently modeled at some reduced data rate.

The residual time series $u_n$ can be crudely described using the following information: RMS energy; a voicing bit, to indicate whether the current frame is voiced or unvoiced; and a pitch period, to define the spacing of a train of impulses during periods of voiced speech. During periods of unvoiced speech, the excitation function shows very broad frequency characteristics, and can be fairly well modeled as white noise.

This approximation to the residual time series $u_n$ is very compact, since now all features of the sample-rate input signal $s_n$ have been converted to frame-rate parameters. However, this provides good data compaction, which is highly desirable for any speech encoding system.

However, this simple speech encoding scheme is not adequate for voice messaging systems. In voice messaging systems, a large number of applications are highly sensitive to speech quality. For example, it has been frequently remarked in the literature, for many years, that introduction of voice mail systems into office environments would provide major improvements in white-collar productivity. However, user acceptance of voice messaging systems is very sensitive to quality, since no businessman is likely to routinely use a system which makes his voice sound ludicrous to the person who receives his message. Prior art systems have had many difficulties in satisfying this quality requirement. The other horn of the dilemma is economic, since two factors must be conserved: processor load and data efficiency. If voice encoding is to be performed by microcomputer-based systems in ordinary offices, the processor load for encoding and decoding must be reasonably small. Similarly, if voice messages are to be easily stored and transmitted, their data efficiency (seconds of speech per kilobyte) must be high.

Thus it is an object of the present invention to provide a voice messaging system wherein the quality of speech reproduced is high.

It is a further object of the present invention to provide a voice messaging system wherein a small processor load is imposed.

It is a further object of the present invention to provide a voice messaging system wherein quality of speech is high and a small processor load is imposed.

It is a further object of the present invention to provide a voice messaging system wherein the data efficiency is high.

It is a further object of the invention to provide a voice messaging system wherein the data efficiency is high and the quality of speech produced is very good.

It is a further object of the present invention to provide a voice messaging system wherein the processor load is low, the data efficiency is high, and the quality of speech reproduced is very good.

To achieve high-quality speech, it is necessary to include more information from the residual time series $u_n$ than simply the pitch, energy, and voicing. A Fourier transform of the residual time series $u_n$ is quite adequate. However, this provides more information than is required. It has been found in the prior art that good quality speech can be reproduced by encoding only a fraction of the full bandwidth of the residual signal $u_n$, and then expanding this fractional bandwidth signal (which is known as the baseband) to provide a full-bandwidth excitation signal at the receiver. In baseband coding methods, the residual signal $u_n$ is transformed to the frequency domain by taking its FFT (fast Fourier transform). A certain number of low frequency samples of the FFT, called the baseband, are selected. This baseband information is encoded and transmitted to the receiver along with pitch, gain, voicing and the LPC parameters. Since only a small segment of the residual frequency spectrum is transmitted to the receiver, the receiver must first construct a reasonable approximation to the full band residual signal. This approximate residual signal $u_n$ can then be used as the excitation function for the LPC synthesis filter. The process of generating the missing higher frequencies in the excitation function at the receiver is usually referred to as high frequency regeneration.

There are several techniques for high frequency regeneration. One of the simplest techniques is to "copy up" the baseband to higher frequency bands. That is, for example, where a 1000 Hz baseband is used, each signal frequency $f_k$ in the baseband would also be copied up to provide the same signal strength at frequencies $f_k+1000$, $f_k+2000$, etc., to regenerate an excitation signal at the receiver. The present invention teaches an improvement in such copying-up methods of high frequency regeneration in baseband speech coding.

See Vishwanathan et al, "Design of a Robust Baseband LPC Coder for Speech Transmission Over a 9.6Kb/sec Noisy Channel", IEEE Transactions on Communications, vol. 30, page 663 (1982), and Kang et al, "Multirate Processor", Naval Research Laboratory Report, September 1978; both of which are hereby incorporated by reference.

The prior art high frequency regeneration process produces undesirable characteristics in the synthesized speech. When the available harmonics at the low frequencies are copied up and substituted for the higher harmonics which were originally present in the excitation, the translated harmonics will not always be located at integer multiples of the fundamental pitch frequency. Also, there will typically be phase offset errors between the various copied-up bands. This results in an inappropriate harmonic relation between the strong frequencies in the regenerated high frequency residual portions and the baseband residual portion. This effect, usually called pitch incongruence or harmonic offset, is perceived as annoying background pitches superimposed with the voice message being processed. This effect is most pronounced for high-pitched speakers. This effect is unacceptable in an office-quality voice messaging system.

Thus, it is an object of the present invention to provide a system which can perform baseband speech encoding and decoding without pitch incongruence.

It is a further object of the present invention to provide a speech coding system which can regenerate high-quality speech without pitch incongruence, and which requires only minimal band width for encoding of the residual signal.

It is a further object of the present invention to provide an economical speech coding system without pitch incongruence.

The present invention teaches a variable width baseband coding scheme. During each frame of the input speech, an estimate of the pitch of the input speech is obtained in addition to the LPC parameters. Using this pitch information, the actual width of the base band for each frame is determined to be the width (as close as possible to the nominal base band width) which contains an integral number of multiples of the fundamental pitch frequency.

In addition, the bottom edge of the base band (the first transmitted FFT sample) is chosen to be an FFT sample closest to the fundamental pitch. By this means, subharmonic pitches, spurious pitches, and low-frequency broadband noise cannot exercise an undue influence on the copying up process.

The present invention requires that the pitch of the speech signal be tracked. This can be done in a variety of ways, as will be discussed below.

According to the present invention, there is provided:

A system for encoding an input speech signal, comprising:

an LPC analysis filter, said analysis filter extracting linear predictive coding (LPC) parameters and a corresponding residual signal from said input speech signals;

a pitch estimator, said pitch estimator extracting a pitch frequency from said speech signal;

means for filtering said residual signal to discard frequencies in said residual signal above a baseband frequency, said baseband frequency being selected to be an integral multiple of said pitch frequency; and an encoder, said encoder encoding information corresponding to said LPC parameters, and to said filtered residual signal.

BRIEF DESCRIPTION OF THE DRAWINGS

The present invention will be described with reference to the accompanying drawings, wherein:

FIGS. 3a, 3b, and 3c show spectrograms illustrating the effect of the system of the present invention wherein FIG. 3a shows the spectrogram of an original residual signal, 3b shows a spectrogram of a residual signal regenerated with a fixed band width baseband according to the prior art, and FIG. 3c shows a spectrogram of the residual signal regenerated using a variable width baseband according to the present invention;

DESCRIPTION OF THE PREFERRED EMBODIMENTS

The present invention will be described with reference to the specific preferred embodiment of the invention as presently practiced. However, as will be appreciated by those skilled in the art, the present invention can be embodied in a wide variety of modifications and variations. The present invention is believed to be the first to teach the use of a variable-width baseband in baseband speech coding, and the present invention is therefore applicable to any baseband speech coding method, not merely to a method limited in any of the particulars described below.

Figure 1:
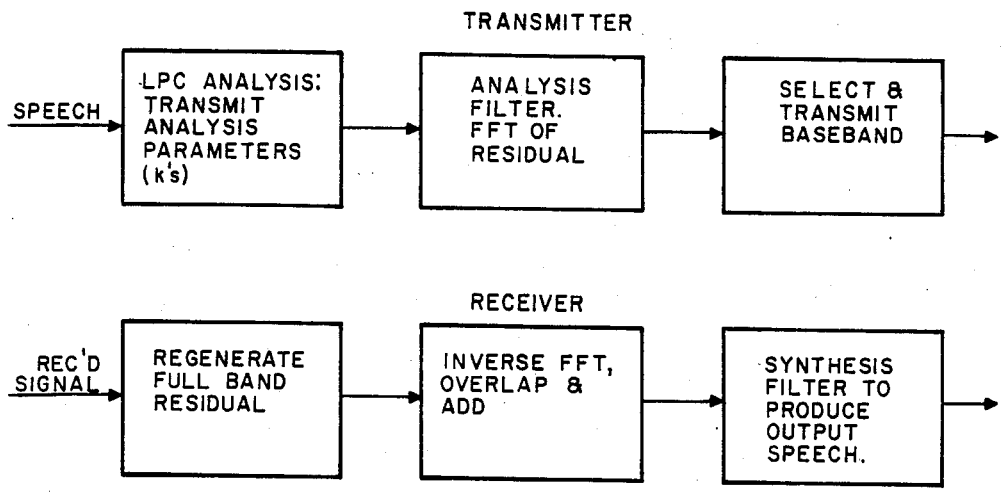
FIG. 1 shows generally an LPC baseband speech coding system, in which the present invention is embodied.
Figure 2:
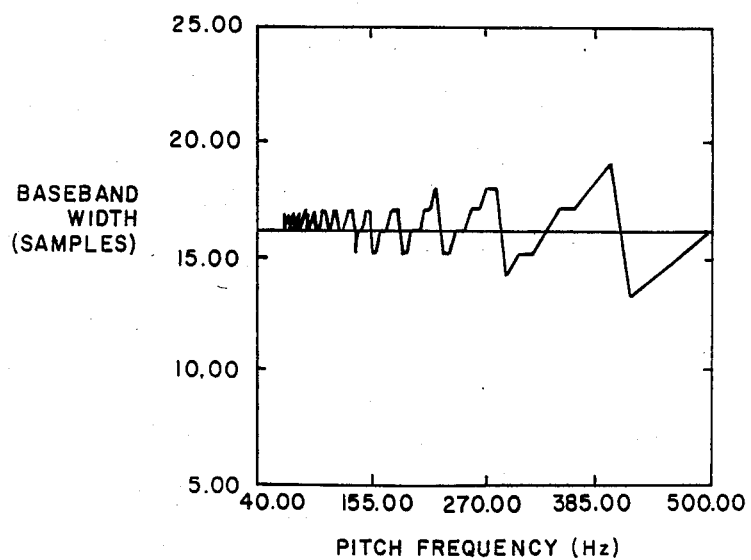
FIG. 2 shows specific examples of the baseband width varied with pitch of the input speech, according to the present invention.
Figure 3A:
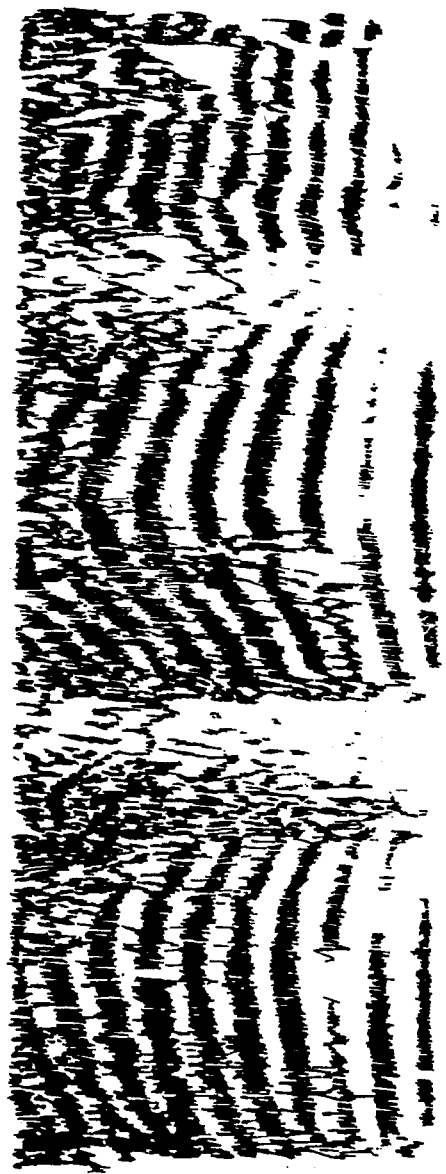
Figure 3B:
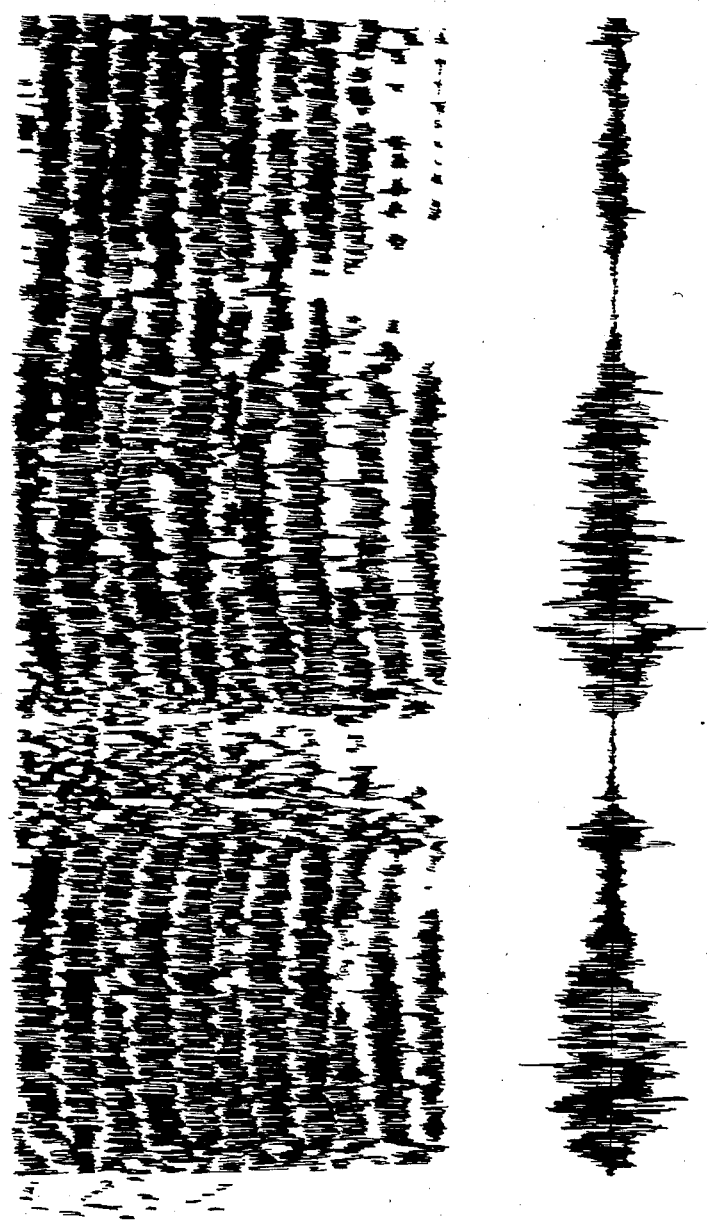
Figure 3C:
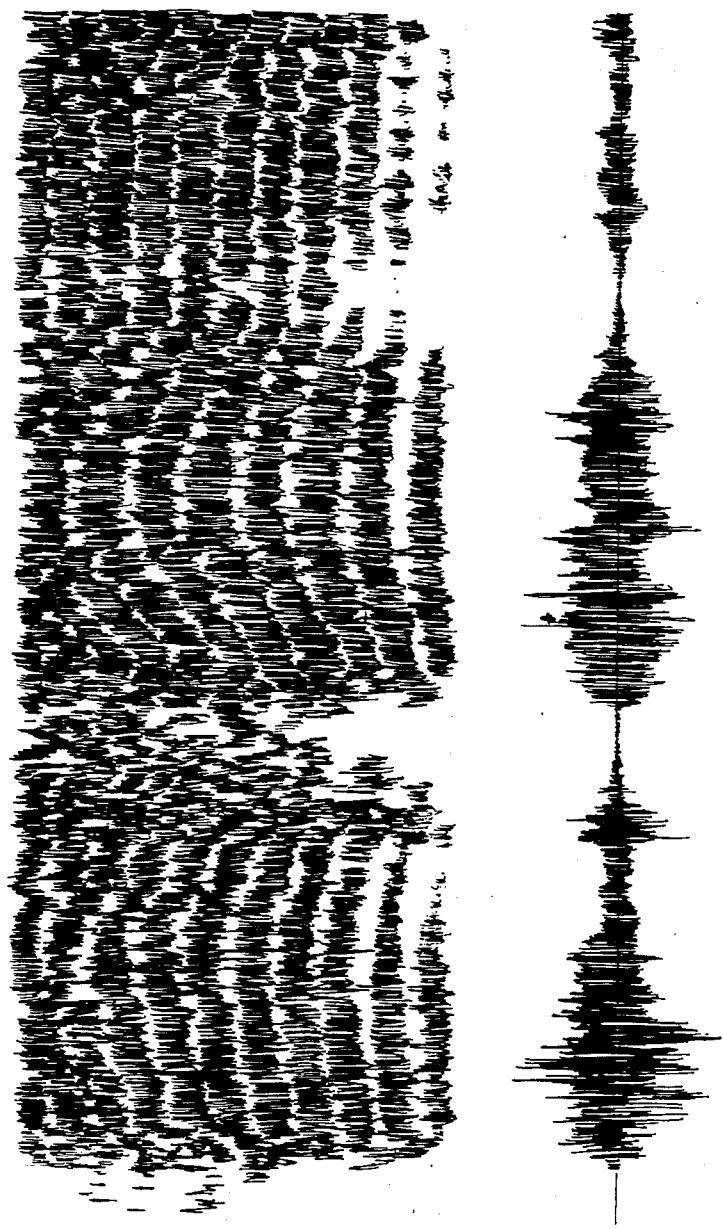
Figure 4:
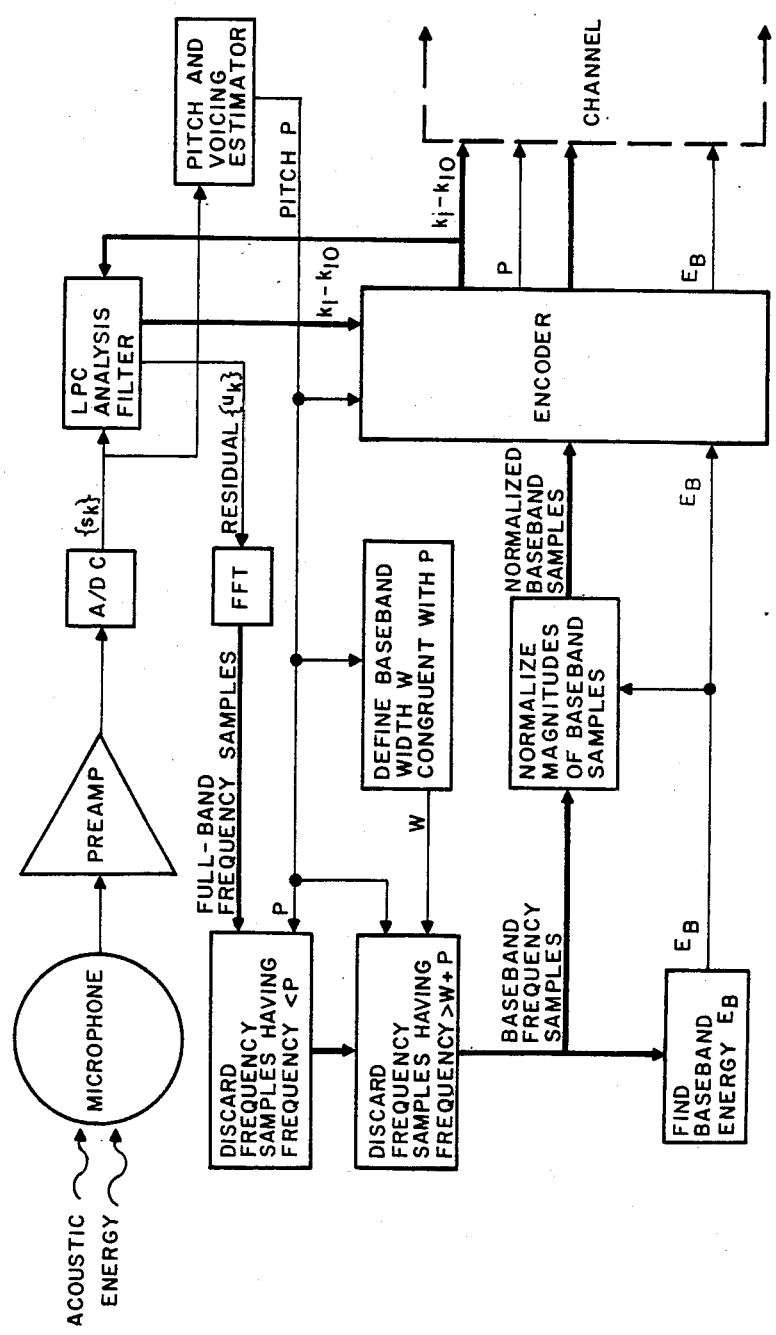
FIG. 4 shows the general configuration of a voice encoding system according to the present invention.

The general organization of the speech encoding system according to the present invention is shown in FIG. 4. That is, the speech input is processed to provide a set of LPC parameters, which may be the reflection coefficients $k_i$ or any equivalent set of parameters, as is well known to those skilled in the art. The LPC parameters are immediately encoded, and these encoded parameters provide one part of the encoded speech signal which is to be stored or transmitted. In the presently preferred embodiment, the LPC parameters are then decoded in the transmitter immediately after they have been encoded, and then these decoded parameters are used to embody an LPC filter. The input is then run through this reconstituted LPC filter to provide a residual signal.

That is, in the presently preferred embodiment the LPC residual signal is derived using an LPC filter based on the encoded and decoded LPC parameters. This is not strictly necessary (that is, the residual signal could be derived simply from the initially derived values of the parameters) but it is desirable, since it means that some of the coding noise which is included in the encoded parameters which the receiver actually receives can be compensated for in the residual signal.

The residual signal is then used as the input to a Discrete Fourier transform, which is naturally preferably an FFT.

In the presently preferred embodiment of the invention, the input speech is sampled at 8 Khz with a precision of 16 bits. The LPC model is selected to be of order 10 with a frame period of 15 msec and a window length of 30 msec. Of course, these specific features of the present embodiment can be widely varied. For example, lower or higher order LPC modeling can be used, as is widely known to those skilled in the art, and the frame period, window length, and sample rate can all be very widely varied.

Figure 5:
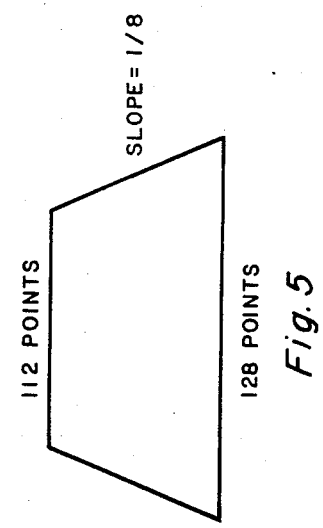
FIG. 5 shows the windowing preferably used for frame overlapping to provide the inputs to the FFT.

Using these sampling and modeling statistics, each frame of speech contains 120 samples. A 128-point FFT is therefore preferably computed for each frame period. Since this means that an 8-point overlap exists between adjacent frames, a trapezoidal window, as shown in FIG. 5, is preferably used to provide smooth overlapping of the windows between adjacent frames. Thus, the result of this step is a magnitude and phase for each of 128 frequency-domain sample points spaced from 0 to 8 Khz.

All samples in the FFT output which correspond to frequencies above the baseband frequency are then discarded. The baseband frequency is determined in accordance with the pitch of the input.

The residual signal is in effect simply filtered to discard frequencies in the residual signal above the baseband. In the presently preferred embodiment this is done in the frequency domain, but this is not by any means necessary. Frequency-domain filtering of the residual is preferable, since the copying-up operation which must be performed in the receiver is preferably performed in the frequency domain. The presently preferred embodiment requires one FFT operation per frame both in the transmitter and the receiver, thus tending to equalize the processing load and to minimize the total processing load.

As shown in FIG. 4, the input speech is also used to form a voicing and pitch decision, to produce a pitch parameter p (which is arbitrarily set equal to zero to indicate unvoiced speech). In the presently preferred embodiment, the pitch extraction is performed by Gold-Rabiner pitch tracking, but may alternatively be performed by any of the wide variety of pitch extraction techniques well known to those skilled in the art. Gold-Rabiner pitch tracking is performed as set forth in the accompanying appendix and in Gold & Rabiner, "Parallel Processing Techniques for Transmitting Pitch Periods of Speech in the Time Domain". Acoustical Soc. of America, vol. 46, pp 442-448 (1969) which is hereby incorporated by reference.

See also Rabiner & Gold, Theory and Application of Digital Signal Processing (1975), which is hereby incorporated by reference, especially section 12.11.

Alternatively, pitch tracking and voicing decisions can be performed as set forth in simultaneously filed U.S. patent application Ser. No. 484,718, filed Apr. 13, 1983, which is hereby incorporated by reference.

If the input speech is unvoiced, the baseband width is simply set at the nominal baseband value, which is 1000 Hz in the presently preferred embodiment (but may be widely modified or varied).

Where a non-zero pitch has been detected, a baseband width W is then defined to provide a congruent relation to the pitch p. In the presently preferred embodiment, the baseband width is chosen to be equal to the integral multiple of the pitch p which is closest to the nominal baseband width. That is, for example, in the presently preferred embodiment, where the nominal baseband width is 1000 Hz, if the pitch of a frame of input speech were determined to be 220 Hz, the closest integral multiple of this to the nominal baseband frequency width would be 1100 Hz, and a baseband width of 1100 Hz would therefore be selected for this frame. That is, the baseband width W is selected to be an integral multiple of the pitch p, W=np, so that when the baseband is copied up at the receiver, the base pitch and harmonics of the base pitch will be copied up onto higher harmonics of the base pitch: $kp+W=(k+n)p$. In this same example, if the pitch of the local frame was 225 Hz instead of 220 Hz, the closest integral multiple of that to the nominal baseband frequency would be 900 Hz, and the width W would therefore be set at 900 Hz.

It should be noted that this step can also be widely modified and varied. For example, the baseband width should be congruent with the pitch of the input speech, but it need not be selected, as described above, to be the congruent pitch which is closest to a given (nominal) baseband width. For example, the variable baseband width could be defined simply to be the congruent width next larger than a nominal width, or next smaller than a maximum nominal width.

A further step preferably used, where a non-zero pitch frequency p has been found, is to discard all frequency samples which have a frequency less than p. This step is not necessary to the present invention, but is preferable, since it serves to avoid low frequency noise (such as 1/f noise), as well as spurious and subharmonic pitches. In this case, the upper frequency of the baseband is preferably not $W_i$ but $W+p$. However, this is unimportant as long as the harmonic relation of the copying up frequency shift to the pitch is preserved.

After the baseband width W has been defined, then only those frequency samples which fall within the baseband are transmitted. That is, the first frequency sample which is transmitted is preferably the frequency which is closest to the pitch p, and the last frequency sample is preferably the frequency sample which is closest to p plus the baseband width W, and no other frequency samples outside of the range between these two frequency samples are transmitted.

It is also not strictly necessary that every frequency within the range between p and W be transmitted. That is, it may be desirable, to further compress band width, to transmit only a subset of the frequencies in this range, for which the magnitude of the frequency sample is higher than a certain minimal value. This partial set of frequencies (with the optional addition of a noise floor) is used as input to the inverse FFT. This will slightly degrade quality, but provides significantly increased coding efficiency.

To encode the frequency samples which are to be transmitted, the baseband FFT samples are preferably transformed to polar coordinates. Preferably, the magnitudes of the baseband samples are normalized by the RMS energy value of the whole baseband to compress the dynamic range which is required to encode the magnitudes of the base band frequency samples. Thus, the total set of encoded parameters includes the LPC parameters, voicing, pitch p, the RMS energy of the baseband, and the magnitude and phase of each frequency sample within the baseband.

Of course it is not necessary to encode exactly these parameters directly, as long as equivalent information is encoded. That is, for example, it would optionally be possible to encode the frequency samples within the baseband such that the pitch p, and therefore the baseband width w, was indicated by the number of frequency samples within the baseband.

The decoding stage of the system reconstructs an approximation to the full band residual signal by copying the baseband up to higher bands. That is, from the set of encoded parameters received by the receiver, the pitch p uniquely defines a baseband width W as described above.

The frequency samples in the transmitted baseband are then decoded, and are copied up at intervals of the base band. That is, each frequency $f_k$ in the baseband is mapped onto additional frequencies $W+f_k$, $2W+f_k$, etc., up to the full desired band width (usually 4 Khz). The magnitude of the copied up frequencies can be taken to be the same as the magnitude of the original frequency, or the magnitude can be rolled off linearly or exponentially for higher frequencies. That is, a base band frequency component represented in time domain as $$A_k \exp(i(f_k t + \phi_k)) \quad (2)$$

can be copied up to harmonics with amplitude $$A_k \exp(i((f_k + nW)t + \phi_k))$$

or $$(A_k/R^n) \exp(i((f_k + nW)t + \phi_k)) \quad (3)$$

All of these embodiments are within the scope of the present invention.

A further modification which can be made in the synthesis portion of the system of the present invention is phase modification for the copied up frequencies. That is, it may similarly be desirable to modify the phase of the copied up frequencies, e.g. according to a linear phase shift constant C, so that a base band frequency would be copied up to phase-shifted harmonic frequencies, as follows:

$$A_k \exp(i((f_k + nW)t + \phi_k + nCW)) \quad (4)$$

These modifications are not within the scope of the presently preferred embodiment, but are optional and well within the scope of the present invention.

It should be noted that various coding techniques can be used on the different parameters transmitted for most efficient encoding. The presently preferred embodiment uses encoding as follows:

TABLE I

| PARAMETER | BITS/FRAME | CODING TECHNIQUE |
| --- | --- | --- |
| Reflection Coefficients | 42 | Minimum Deviation |
| Pitch | 6 | Log |
| Baseband RMS | 7 | Linear/Log |
| FFT magnitude | 2 per magnitude | Maximum Entropy |
| FFT phase | 3-4 per phase | Uniform |

It should be noted that the present invention provides what is in effect variable rate coding. That is, since the baseband width is variable, the number of frequency samples which is transmitted in each frame is also variable (in the presently preferred embodiment), and this leads to a varied coding rate. However, the variation in rate tends to average out over the course of an utterance, so that the average coding rate is quite close to the coding rate which would be obtained if the baseband used were simply the nominal base band width in every frame.

Once the transmitted baseband has been copied up in the receiver to provide the frequency spectrum of the full residual signal, an inverse FFT is then performed to regenerate the residual energy signal. Preferably some overlap averaging is performed between the regenerated residual signal in adjacent frames, to provide a smooth excitation function to the LPC synthesis filter in the receiver.

Figure 6:
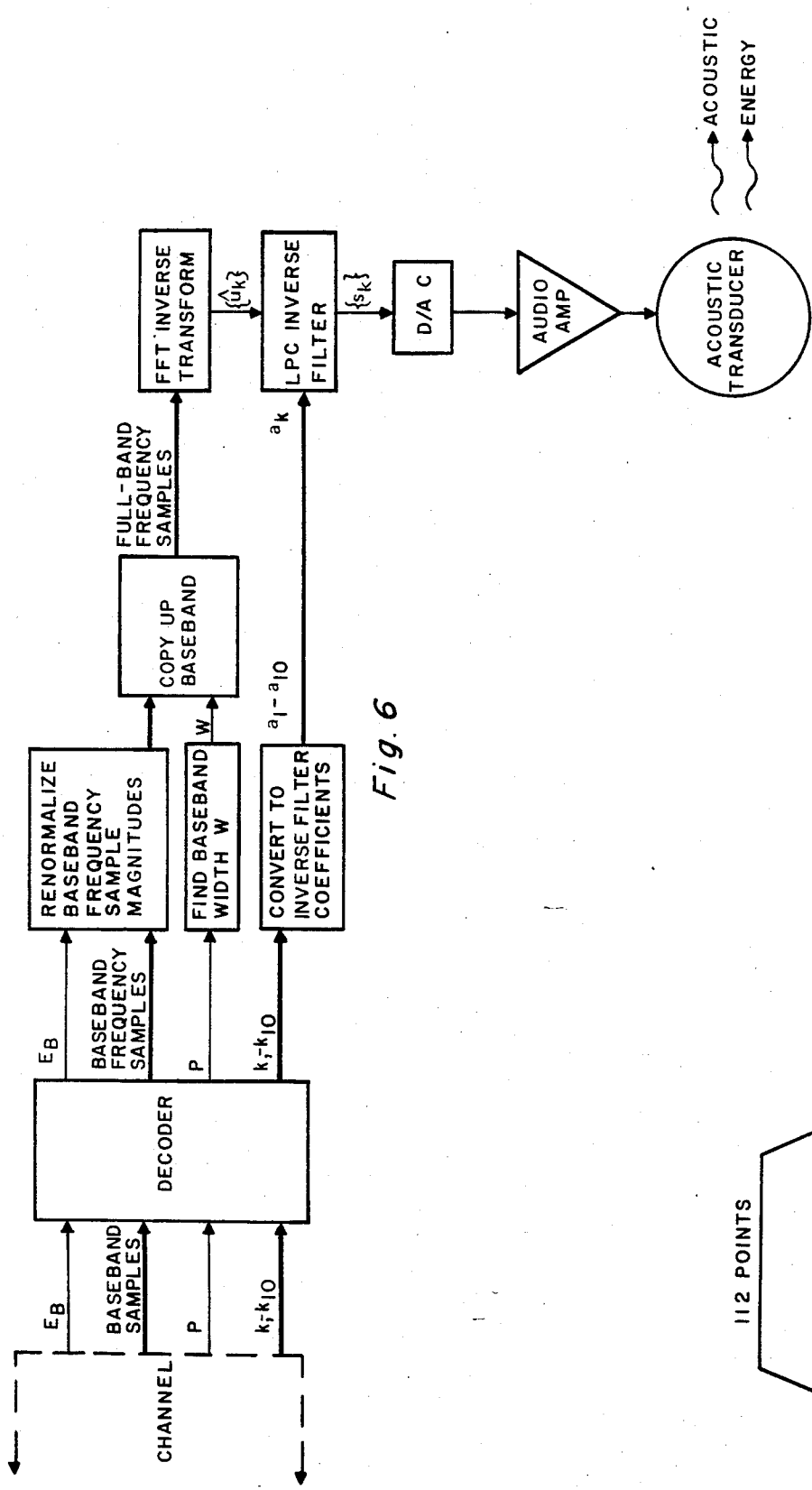
FIG. 6 shows the general configuration of a voice decoding station according to the present invention.

This provides a regenerated residual energy signal, as well as LPC model parameters. These are used to regenerate a speech signal in the receiver as shown in FIG. 6.

That is, the baseband energy scalar is used to renormalize the magnitude of the baseband frequency samples. Also, the pitch and voicing are used to compute the baseband width W. The renormalized baseband frequency samples are then copied up, that is the magnitude and phase of each frequency $f_k$ define a magnitude and phase for frequencies $f_k + w$, $f_k + 2W$, etc. This provides a full frequency-domain representation of the excitation function, and a further FFT step is then used to transform this frequency-domain information into the time series $\hat{u}_k$. This estimated excitation function $\hat{u}_k$ is the input to the LPC filter, which filters the estimated excitation function in accordance with the LPC parameters, to provide an estimated time series $\hat{s}_k$ which is a good estimate of the original speech input.

Optionally, energy normalization can be used. In this case, a find amplifier stage is used to adjust the estimated time series $\hat{s}_k$ according to the frame energy.

In the presently preferred embodiment, the frame energy is not one of the parameters encoded. However, the energy of the residual signal provides an estimate (albeit an imperfect one) of the frame energy, and the energy of the residual is found from the frequency domain energy information provided by the baseband energy as multiplied during the copying-up step.

It is worth noting that, in the variable baseband coding method of the present invention, the frame to frame variation of the base bandwidth is not necessarily smooth. In fact, there will typically be significant jumps in the width of the baseband from frame to frame.

The computation of the baseband width is subject to various sources of error. One such source of error is the limited resolution of the discrete Fourier transform operation. Another source of error is due to the pitch quantization. Pitch quantization is inherent in the restriction that the pitch period be an integral multiple of the sample period.

The accompanying microfiche appendix, which is hereby incorporated by reference, sets forth the Fortran code with which the present invention is presently embodied on a VAX 11/780 minicomputer available from Digital Equipment Corp. of Maynard, Mass. However, as discussed above, the best mode contemplated for application of the present invention for the future is in microcomputer rather than minicomputer systems, preferably in situations where a multitude of microcomputer systems are interconnected over a local network (or even over phone lines), for voice messaging and voice mail applications.

That is, the invention as presently practiced uses a VAX with high-precision data conversion (D/A and A/D), half-giga byte hard-disk drives, and a 9600 baud modem. By contrast, a microcomputer-based system embodying the present invention is preferably configured much more economically. For example, a microcomputer system based upon the 8088 microprocessor (such as the TI Professional Computer) could be used together with lower-precision (e.g. 12-bit) data conversion chips, floppy or small Winchester disk drives, and preferably a modem (or codec). Using the coding parameters given above, a 9600 baud channel gives approximately real-time speech transmission rates, but, of course, the transmission rate is nearly irrelevant for voice mail applications, since buffering and storage is necessary anyway.

As will be obvious to those skilled in the art, the present invention can be modified and varied widely, and is therefore not limited except as specified in the accompanying claims.

What is claimed is:

1. A system for encoding human speech so as to enable the subsequent regeneration thereof, said system comprising:
   LPC analysis means for analyzing an analog speech signal provided as an input thereto as respective frames of speech data in accordance with the LPC (Linear Predictive Coding) model to extract LPC parameters and a corresponding residual signal as an output representative of the analog speech signal for each frame;
   pitch estimation means for extracting a pitch frequency from the speech signal and producing a pitch frequency estimation signal as an output therefrom for each frame of speech data;
   filter means operably coupled to the outputs of said LPC analysis means and said pitch estimation means for filtering said residual signal to discard frequencies in said residual signal above a baseband frequency for each frame of speech data, said baseband frequency being selected to be an integral multiple of the frequency of said pitch as estimated for each frame of speech and being variable from frame to frame in accordance with changes in the magnitude of said pitch frequency estimation signal; and
   means operably coupled to the outputs of said LPC analysis means and said filter means for encoding information corresponding to said LPC parameters and to said filtered residual signal in compressed form representative of the analog speech signal and from which a replica of the analog speech signal may be derived.

2. The system of claim 1, wherein said filter means is effective to also discard portions of said residual signal having frequencies less than said pitch frequency.

3. The system of claim 1, further including receiver means, said receiver means comprising:
   decoder means connected to a data channel and operably associated with said encoding means via the data channel, said decoder means being effective to decode the encoded information from said encoding means and to output decoded information corresponding to said LPC parameters and said filtered residual signal;
   means operably coupled to said decoder means for copying up said decoded filtered residual signal to produce a full bandwidth excitation signal; and
   LPC synthesis filter means operably coupled to said copying-up means and said decoder means, said LPC synthesis filter means filtering said full bandwidth excitation signal in accordance with said LPC parameters to provide a reconstituted speed signal.

4. The system of claim 3, wherein said filtered residual signal is encoded in the form of frequency-domain information, and said copying-up means shifts and then inverse Fourier-transforms said decoded filtered residual information.

5. The system of claim 1, wherein said encoding means encoder said filtered residual signal in the form of frequency-domain.

6. The system of claim 1, wherein said LPC parameters are reflection coefficients.

7. The system of claim 3, wherein said LPC parameters are reflection coefficients.

8. The system of claim 1, wherein said encoding means is also operably coupled to said pitch estimation means for encoding information corresponding to said pitch frequency.

9. The system of claim 8, wherein said pitch estimation means also extracts a voicing decision from said speech signal, and wherein said encoding means also encodes information corresponding to said voicing decision.

10. The system of claim 1, wherein said LPC analysis means further determines the RMS energy of said input speech signal, and wherein said encoding means also encodes information corresponding to said RMS energy of said speech signal.

11. The system of claim 3, wherein said LPC analysis means further determines the RMS energy of said input speech signal, and wherein said encoding means also encodes information corresponding to said RMS energy of said speech signal.

12. The system of claim 11, wherein said decoder means also decodes and outputs information corresponding to said RMS energy of said input speech signal, and the system further comprising:
amplifier means connected to said LPC synthesis filter means and amplifying said reconstituted speech signal in accordance with said information corresponding to said RMS energy of said speech signal.

13. A method for encoding an input speech signal, comprising the steps of:
analyzing said input speech signal as provided in respective frames of speech data to extract linear predictive coding (LPC) parameters and a corresponding residual signal from said input speech signal, said LPC parameters being extracted once per frame of speech at a predetermined frame rate;
estimating the pitch of said input speech signal for each frame of speech;
filtering said residual signal to discard frequencies in said residual signal above a baseband frequency for each frame of speech, said baseband frequency being an integral multiple of the frequency of said pitch as estimated for each frame of speech and being variable from frame to frame in accordance with changes in the magnitude of the estimated pitch; and
encoding information corresponding to said LPC parameters and to said filtered residual signal.

14. The method of claim 13, wherein said filtering step comprises Fourier-transforming said residual signal and discarding frequencies from said Fourier-transform residual signal above said baseband frequency.

15. A method for digitally transmitting human speech as represented by a speech signal, comprising the steps of:
receiving an input speech signal as provided in respective frames of speech data during corresponding frame periods;
extracting linear predictive coding (LPC) parameters and a corresponding residual signal from said input speed signal, said LPC parameters being extracted once every frame period, said frame period being a predetermined length of time; estimating the pitch of said input speech signal during each said frame period;
filtering said residual signal to discard frequencies in said residual signal above a baseband frequency for each frame period, said baseband frequency being an integral multiple of the frequency of said pitch as estimated for each frame period and being variable from frame period to frame period in accordance with changes in the magnitude of the estimated pitch;
encoding information corresponding to said LPC parameters and to said filtered residual signal in compressed form representative of the input speech signal and from which a replica of the speech signal may be derived;
passing said encoded information corresponding to said LPC parameters and to said filtered residual signal through a data channel;
decoding the encoded information corresponding to said LPC parameters and to said filtered residual signal from said data channel;
copying up said decoded filtered residual signal to produce a full bandwidth excitation signal;
filtering said excitation signal in accordance with said LPC parameters to provide a reconstituted speech signal.

16. A method of encoding an analog speech signal comprising:
analyzing the analog speech signal as provided in respective frames of speech data to extract a plurality of Linear Predictive Coding (LPC) parameters and a corresponding residual signal from said analog speech signal, with said LPC parameters being extracted once for each frame of speech at a predetermined frame rate;
estimating the pitch p and voiced or unvoiced status of said analog speech signal for each frame of speech;
setting a nominal baseband width when the analog speech signal has been estimated as unvoiced;
setting a baseband width W in accordance with the estimated pitch p for each frame of speech selected to be equal to an integral multiple of the estimated pitch p which is closest to the nominal baseband width when the analog speech signal has been estimated as voiced, said baseband width W being variable from frame to frame in accordance with changes in the magnitude of the estimated pitch p;
filtering said residual signal in accordance with the baseband widths as set for respective frames of speech so as to discard frequencies in said residual signal above the baseband width for each frame of speech; and
encoding information corresponding to said LPC parameters and to said filtered residual signal as digital speech data in compressed form representative of the analog speech signal and from which a replica of the analog speech signal may be derived.

17. A method as set forth in claim 16, wherein the analyzing of the analog speech signal in extracting the plurality of LPC parameters and the corresponding residual signal therefrom is accomplished by
initially extracting the plurality of LPC parameters from the speech signal;
immediately encoding said plurality of LPC parameters as digital speech parameter signals representative of said plurality of LPC parameters;
immediately decoding said digital speech parameter signals to provide a replica of said plurality of LPC parameters as an LPC filter;
passing the same speech signal in its original form through said LPC filter; and
extracting the corresponding residual signal from the speech signal as the output from said LPC filter.

18. A method as set forth in claim 17, further including
performing a Fourier transform on the residual signal to place the residual signal in the frequency-domain prior to the filtering step; and
filtering said residual signal in the frequency-domain to remove frequencies above the baseband frequency.

* * * * *